(12) United States Patent
Lu

(10) Patent No.: US 12,649,104 B2
(45) Date of Patent: Jun. 9, 2026

(54) GAME CONTROLLER

(71) Applicant: Shenzhen Jierui Hong Electronics Co., LTD, Shenzhen (CN)

(72) Inventor: Chunming Lu, Shenzhen (CN)

( * ) Notice: Subject to any disclaimer, the term of this patent is extended or adjusted under 35 U.S.C. 154(b) by 205 days.

(21) Appl. No.: 18/733,105

(22) Filed: Jun. 4, 2024

(65) Prior Publication Data

US 2025/0345704 A1 Nov. 13, 2025

(30) Foreign Application Priority Data

May 10, 2024 (CN) .......................... 202410577515.1

(51) Int. Cl.
*A63F 13/24* (2014.01)

(52) U.S. Cl.
CPC ................................... *A63F 13/24* (2014.09)

(58) Field of Classification Search
CPC ....................................................... A63F 13/24
See application file for complete search history.

(56) References Cited

U.S. PATENT DOCUMENTS 10,543,424 B2 * 1/2020 Fahmie ................. A63F 13/803
2011/0098116 A1 * 4/2011 Liu .......................... A63F 13/98
463/38

2014/0024456 A1 * 1/2014 Ashley .................... A63F 13/24
463/37
2020/0384353 A1 * 12/2020 Fahmie ................. A63F 13/23
2021/0268371 A1 * 9/2021 Fahmie ................. A63F 13/803
2022/0370894 A1 * 11/2022 Fahmie ................. A63F 13/22
2023/0071216 A1 * 3/2023 Samperi ................. A63F 13/24
2024/0207722 A1 * 6/2024 Maker ..................... A63F 13/24
2025/0058212 A1 * 2/2025 Lu .......................... H01H 13/14
2025/0153038 A1 * 5/2025 Yang ....................... A63F 13/24
2025/0153039 A1 * 5/2025 Yang ....................... A63F 13/24
2025/0345704 A1 * 11/2025 Lu .......................... A63F 13/24

* cited by examiner

*Primary Examiner* — Jay Trent Liddle
(74) *Attorney, Agent, or Firm* — Daniel M. Cohn; Howard M. Cohn

(57) ABSTRACT

The present disclosure provides game controller, comprising: comprising a bottom shell, a surface shell that butts up against the bottom shell to enclose an accommodation cavity, a control circuit board is fixedly installed in the accommodation cavity and a function key module which is electrically connected to the control circuit board and comprises more than two function keys, the control circuit board is correspondingly equipped with a plurality of function control modules; each function control module is respectively connected with the function key module to give each function key the corresponding function and form a different function sorting layout, the function key module also comprises a function switching module for switching the function sorting layout corresponding to the function key, the function switching module changes the function sorting layout of the function key by switching on different function control modules.

9 Claims, 8 Drawing Sheets

GAME CONTROLLER

TECHNICAL FIELD

The present disclosure relates to a technical field of game console accessories, and in particular to a game controller.

BACKGROUND

A game controller is a device that controls game characters by manipulating control buttons and handing joysticks, wherein the game controller will be equipped with a function key module for controlling the actions of the game character, the function key module comprises more than two function keys arranged according to fixed orientations, the function keys respectively implement different operating functions and form a predetermined function sorting layout.

However, different game platforms have different function sorting layouts of the function keys, and existing controllers can usually only be adapted to one game platform. When players switch to different game platforms, the positions of the corresponding function keys on the game controller do not match those in the game prompts, and it is easy for players to press the wrong function keys, causing game operation errors.

SUMMARY

The present disclosure provides a game controller, and solves the problem of being able to quickly adjust the function sorting layouts of the function keys to adapt to different game platforms.

In order to realize the above purpose, the present disclosure provides a game controller, comprising a bottom shell, a surface shell that butts up against the bottom shell to enclose an accommodation cavity, a control circuit board is fixedly installed in the accommodation cavity and a function key module which is electrically connected to the control circuit board and comprises more than two function keys, the control circuit board is correspondingly equipped with a plurality of function control modules, each function control module is respectively connected with the function key module to give each function key a corresponding function and form a different function sorting layout, the function key module also comprises a function switching module for switching the function sorting layout corresponding to the function key, the function switching module changes the function sorting layout of the function key by switching on different function control modules.

In one embodiment, the function switching module comprises function switching piece pivotedly arranged in the accommodating cavity and a driving mechanism that drives the function switching piece to connect different function control modules, a paddle for switching on any one of the function control modules protrudes from the edge of the function switching piece, the function control module is correspondingly arranged around the outside of the function switching piece, the driving mechanism drives the function switching piece to rotate at a predetermined angle so that the paddle connects to the function control module at a predetermined position.

In one embodiment, the function switching piece is provided with a gear at a predetermined position, the driving mechanism comprises a driving gear meshed with the function switching piece and a function switching switch used to control the rotation angle of the driving gear so that the paddle is connected to the function control module at a predetermined position.

In one embodiment, the driving mechanism also comprises a rotating motor, and the driving gear is in transmission connection with the output end of the rotating motor, the function switching switch is used to control the rotation angle of the rotating motor.

In one embodiment, a mandrel extends from the axis center of the driving gear, the end of the mandrel passes through the surface shell and/or the bottom shell and forms the function switching switch, and the end surface of the function switching switch forms an operating part for screwing operation.

In one embodiment, the driving gear is a double gear set, the function switching switch is a push-pull rack, one gear of the double gear set is meshed with the function switching piece and the other gear is meshed with the push-pull rack, the push-pull rack is pushed and pulled to drive the double gear set to rotate, thereby driving the function switching piece to rotate at a predetermined angle and allowing the paddle to connect to the function control module at a predetermined position.

In one embodiment, the function switching piece is also provided with a function switching switch at a predetermined distance from the paddle, the surface shell and/or the bottom shell are provided with movable grooves corresponding to the function switching switch, the function switching switch slides to a predetermined position in the movable groove to correspondingly enable the paddle to connect to the predetermined function control module.

In one embodiment, the function key module also comprises a conductive chassis with conductive contacts on the bottom surface corresponding to each function key, the function key comprises a keycap with one end exposed from the surface shell and a keycap base docked and fixed with the keycap, the keycap base is correspondingly abutted against the top surface of the conductive chassis.

In one embodiment, connecting ears protrude from the side of the keycap, the keycap base extends out of the connecting post corresponding to the connecting ears and forms an accommodating groove in the middle, the function switching piece is correspondingly embedded in the accommodating groove.

In one embodiment, the function key module also comprises an indicator light corresponding to the position of each function key, the surface of the function switching piece is engraved with a character mark corresponding to the function sorting layout of each of the function control modules, the indicator light projects the character mark on the function key to display the character mark, the function control module is electrically connected to the indicator lights and controls the luminous color of the indicator lights corresponding to each of the functional sorting layouts to form a corresponding lighting layout.

After adopting the above technical solutions, the game controller provided by the present disclosure has beneficial effects as follows:

In the embodiment of the present invention, the control circuit board is correspondingly equipped with a plurality of function control modules, the function key module and the function control module are selectively connected through the function switching module to assign corresponding functions to each function key to form a function sorting layout that matches the host device of the game platform currently used by the player, when the player switches to host devices of other game platforms, the function switching module performs corresponding switch switching and connects to the corresponding function control module. By increasing the number of function control modules, the function sorting layout of most game platforms on the market can be reproduced, maximizing the compatibility of the game controller with game platform devices and improving the player's experience.

BRIEF DESCRIPTION OF DRAWINGS

In order to more clearly illustrate technical solutions in embodiments of the present disclosure, drawings required in description or prior art are briefly introduced below, and obviously, the drawings in the following description are merely some embodiments of the present disclosure. For a person having ordinary skill in art, other drawings may be obtained according to the drawings without creative efforts.

REFERENCE NUMBER IN THE DRAWINGS

Figure 1:
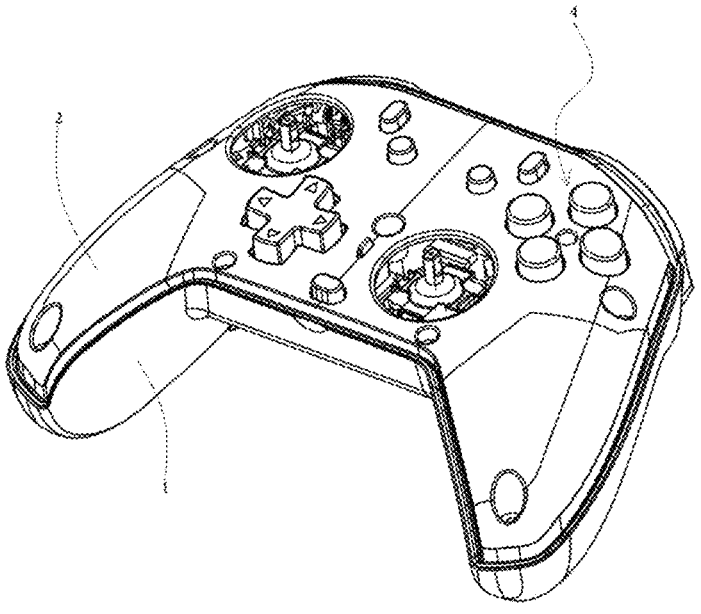
FIG. 1 is a schematic diagram of the overall structure of one embodiment of a game controller provided by the present disclosure.

| bottom shell | 1 | surface shell | 2 |
|---|---|---|---|
| control circuit board | 3 | function key module | 4 |
| movable groove | 10 | function control module | 30 |
| function key | 41 | function switching module | 43 |
| function switching module | 430 | driving mechanism | 432 |
| paddle | 4301 | gear | 4303 |
| driving gear | 4321 | function switching switch | 4323 |
| rotating motor | 4325 | mandrel | 4327 |
| push-pull rack | 4323 | conductive chassis | 45 |
| keycap | 410 | keycap base | 412 |
| connecting ears | 4101 | connecting post | 4121 |
| accommodating groove | 4123 | character mark | 434 |

DETAILED DESCRIPTION

The following describes in detail the embodiments of the present disclosure, examples of which are illustrated in the accompanying drawings, wherein the same or similar reference numerals refer to the same or similar elements or elements having the same or similar functions throughout. The embodiments described below with reference to the accompanying drawings are exemplary, and are not intended to limit the present disclosure.

In order to make the purpose, technical solutions, and advantages of the present disclosure clear, the following further describes the present disclosure in detail with reference to accompanying drawings and embodiments.

Referring to FIG. 1 to FIG. 8, the present disclosure provides a game controller, comprising: a bottom shell 1, a surface shell 2 that butts up against the bottom shell 1 to enclose an accommodation cavity, a control circuit board 3 is fixedly installed in the accommodation cavity and a function key module 4 which is electrically connected to the control circuit board 3 and comprises more than two function keys 41, the control circuit board 3 is correspondingly equipped with a plurality of function control modules 30; each function control module 30 is respectively connected with the function key module 4 to give each function key 41 the corresponding function and form a different function sorting layout, the function key module 4 also comprises a function switching module 43 for switching the function sorting layout corresponding to the function key 41, the function switching module 43 changes the function sorting layout of the function key 41 by switching on different function control modules 30.

In the embodiment of the present invention, the control circuit board 3 is correspondingly equipped with a plurality of function control modules 30; the function key module 4 and the function control module 30 are selectively connected through the function switching module 43 to assign corresponding functions to each function key 41 to form a function sorting layout that matches the host device of the game platform currently used by the player, when the player switches to host devices of other game platforms, the function switching module 43 performs corresponding switch switching and connects to the corresponding function control module 30. By increasing the number of function control modules 30, the function sorting layout of most game platforms on the market can be reproduced, maximizing the compatibility of the game controller with game platform devices and improving the player's experience.

Figure 2:
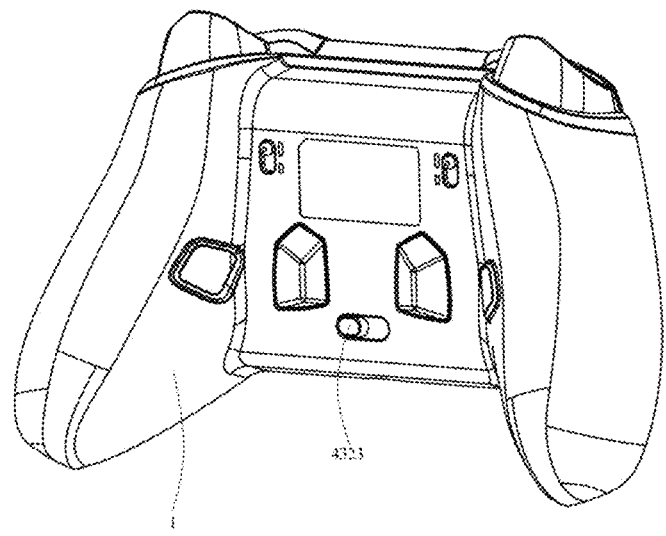
FIG. 2 is another schematic diagram of the overall structure of one embodiment of a game controller provided by the present disclosure.
Figure 3:
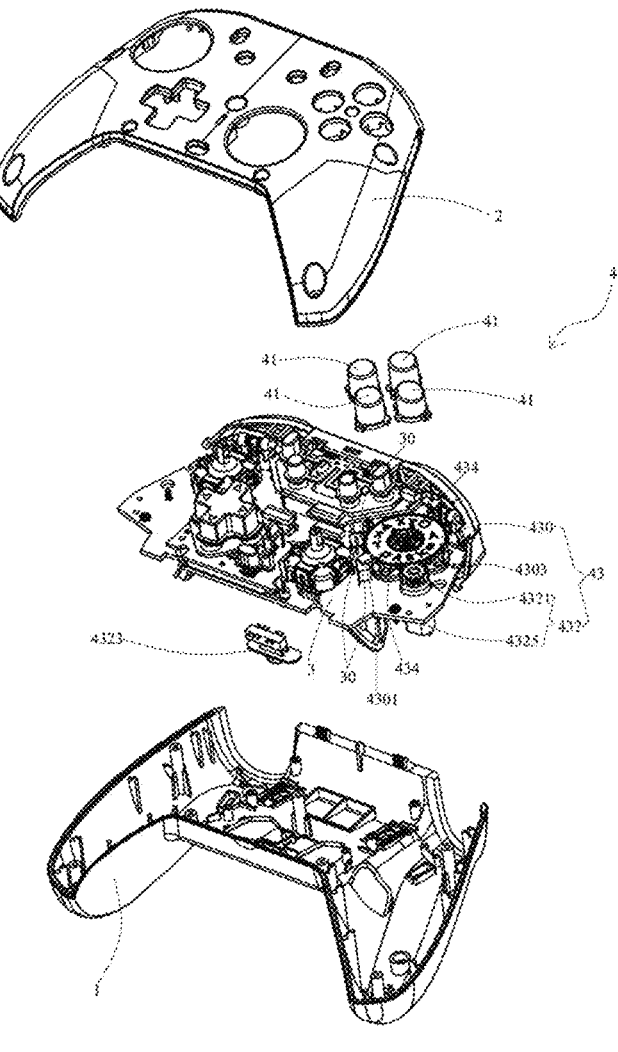
FIG. 3 is a schematic diagram of one embodiment of the game controller provided by the present disclosure in a disassembled state.

In one embodiment, referring to FIG. 1 to FIG. 3, the function switching module 43 comprises function switching piece 430 pivotedly arranged in the accommodating cavity and a driving mechanism 432 that drives the function switching piece 430 to connect different function control modules 30, a paddle 4301 for switching on any one of the function control modules 30 protrudes from the edge of the function switching piece 430, the function control module 30 is correspondingly arranged around the outside of the function switching piece 430, the driving mechanism 432 drives the function switching piece 430 to rotate at a predetermined angle so that the paddle 4301 connects to the function control module 30 at a predetermined position. In this embodiment, the driving mechanism 432 drives the function switching piece 430 to rotate until the paddle 4301 at its edge connects to the function control module 30 at a predetermined position, and the function control module 30 accesses and controls the function key module 4 and implements corresponding function sorting layout. During specific implementation, the paddle 4301 can be set to be conductive, the paddle 4301 is connected to the reserved power port on the function control module 30 to connect the function control module 30 and the function key module 4, the paddle 4301 can also be set as an insulator, and a switch is reserved on the function control module 30. By moving the paddle 4301 to the function control module 30, the switch is turned on to connect the function control module 30 and the function key module 4, more other types of sensor devices or wireless communication devices may also be used to connect the function control module 30 and the function key module 4.

Figure 4:
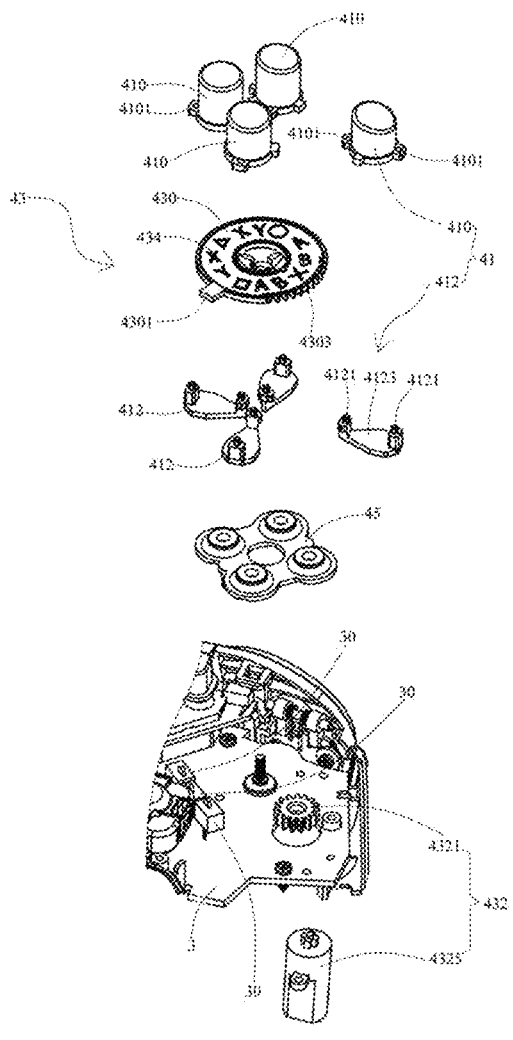
FIG. 4 is a schematic structural diagram of a function key module of one embodiment of the game controller provided by the present disclosure in a disassembled state.
Figure 5:
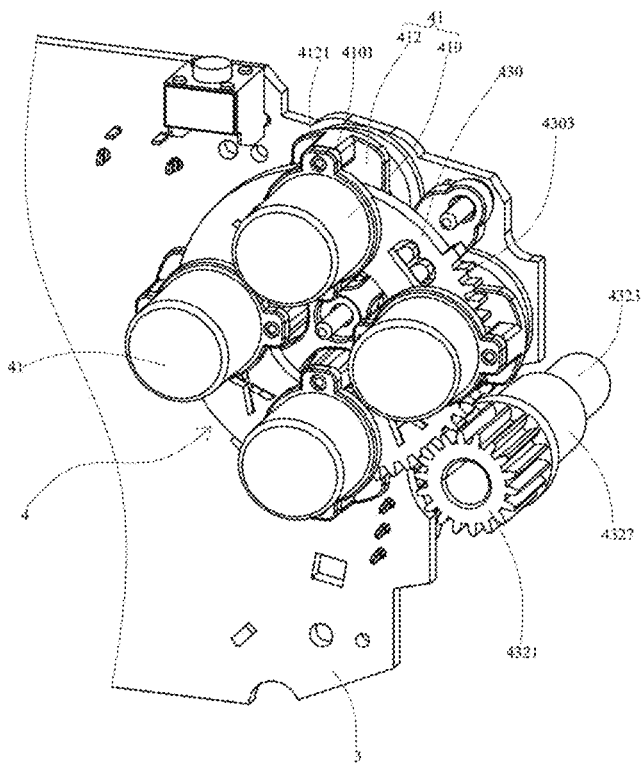
FIG. 5 is a schematic structural diagram of a function key module of one embodiment of the game controller provided by the present disclosure.
Figure 6:
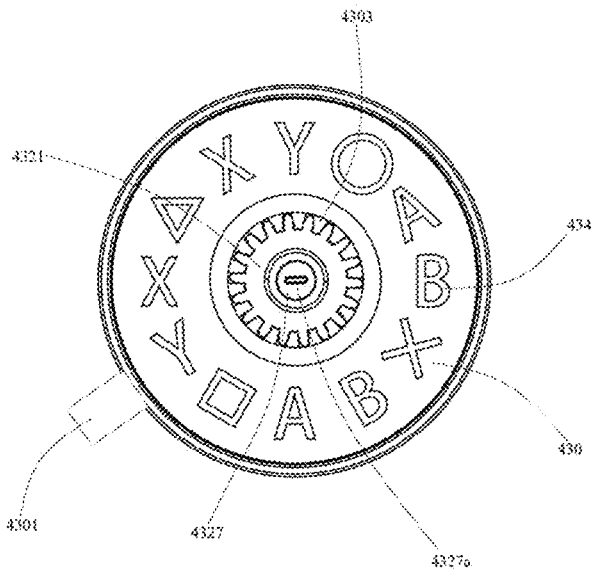
FIG. 6 is a schematic structural diagram of a function key module of one embodiment of the game controller provided by the present disclosure.

In one embodiment, referring to FIG. 3 to FIG. 9, the function switching piece 430 is provided with a gear 4303 at a predetermined position, the driving mechanism 432 comprises a driving gear 4321 meshed with the function switching piece 430 and a function switching switch 4323 used to control the rotation angle of the driving gear 4321 so that the paddle 4301 is connected to the function control module 30 at a predetermined position. In this embodiment, the gear 4303 are provided at a predetermined position on the function switching piece 430, the driving gear 4321 in the driving mechanism 432 is meshed with the gear 4303 and rotates at a predetermined angle under the control of the function switching switch 4323 to move the paddle 4301 to a predetermined position to turn on the corresponding function control module 30 to realize switching of the function sorting layout. During specific implementation, the gear 4303 may be provided on the outer edge of the function switching piece 430, the driving gear 4321 can mesh with the gear 4303 on the side of the function switching piece 430. As shown in FIG. 6, a connection hole with the gear 4303 formed on the inner wall can also be opened in the function switching piece 430, the driving gear 4321 is correspondingly inserted into the connecting hole and meshes with the gear 4303.

In one embodiment, referring to FIG. 1 to FIG. 3, the driving mechanism 432 also comprises a rotating motor 4325, and the driving gear 4321 is in transmission connection with the output end of the rotating motor 4325, the function switching switch 4323 is used to control the rotation angle of the rotating motor 4325. In this embodiment, by setting a driving motor to drive the driving gear 4321 to rotate, it is more convenient to set the corresponding gear in advance for the function switching switch 4323 to shift and adjust, the function switching switch 4323 is switched to the corresponding gear to start the rotating motor 4325 to drive the paddle 4301 to move to the corresponding function control module 30.

In one embodiment, referring to FIG. 5 and FIG. 6, a mandrel 4327 extends from the axis center of the driving gear 4321, the end of the mandrel 4327 passes through the surface shell 2 and/or the bottom shell 1 and forms the function switching switch 4323, and the end surface of the function switching switch 4323 forms an operating part 4327a for screwing operation. In this embodiment, the mandrel 4327 is extended from the axis center of the driving gear 4321, and the end of the mandrel 4327 passes through the surface shell 2 and/or the bottom shell 1 to form the function switching switch 4323. The player drives the function switching piece 430 to rotate by twisting the function switching switch 4323 so that the paddle 4301 connects to the corresponding function control module 30.

Figure 7:
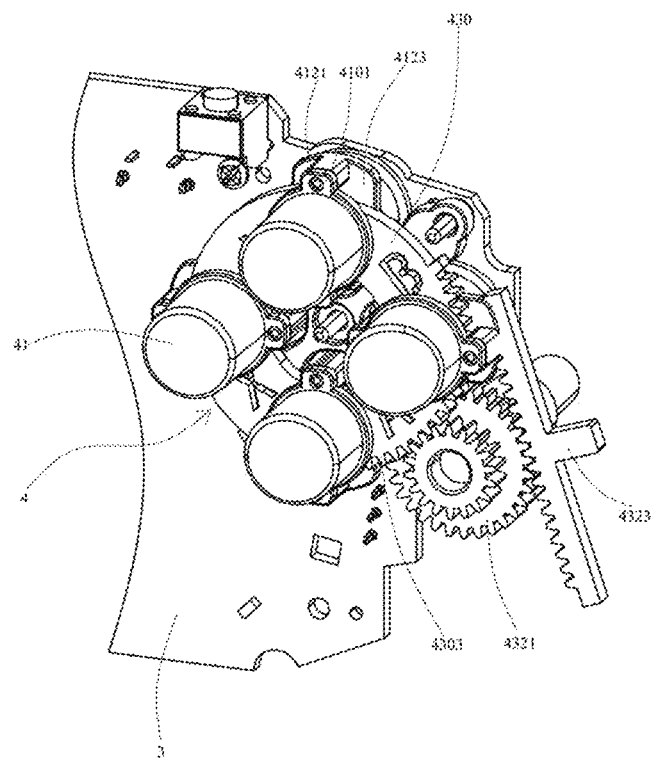
FIG. 7 is a schematic structural diagram of a function key module of one embodiment of the game controller provided by the present disclosure.

In one embodiment, referring to FIG. 7, the driving gear 4321 is a double gear set, and the function switching switch 4323 is the push-pull rack. One gear of the double gear set 4321 is meshed with the function switching piece 430 and the other gear is meshed with the push-pull rack 4323, the push-pull rack 4323 is pushed and pulled to drive the double gear set 4321 to rotate, thereby driving the function switching piece 430 to rotate at a predetermined angle and allowing the paddle 4301 to connect to the function control module 30 at a predetermined position. In this embodiment, the driving gear 4321 is set as the double gear set 4321, and the function switching switch 4323 is the push-pull rack 4323, one gear of the double gear set 4321 is meshed with the function switching piece 430 and the other gear is meshed with the push-pull rack 4323, the rotation angle of the function switching piece 430 is controlled by controlling the distance of pushing and pulling the push-pull rack 4323. The structure is simple and the operation is convenient. During the specific implementation process, corresponding gear marks will also be set on the game controller to locate the moving position of the push-pull rack 4323, prompting the player that the function sorting layout of the function keys 41 has been switched into place.

Figure 8:
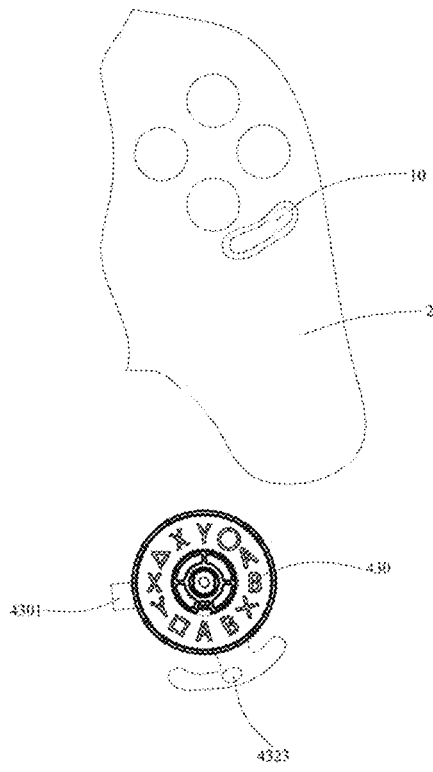
FIG. 8 is a schematic structural diagram of a function key module of one embodiment of the game controller provided by the present disclosure.

In one embodiment, referring to FIG. 8, the function switching piece 430 is also provided with the function switching switch 4323 at a predetermined distance from the paddle 4301, the surface shell 2 and/or the bottom shell 1 are provided with movable grooves 10 corresponding to the function switching switch 4323, the function switching switch 4323 slides to a predetermined position in the movable groove 10 to correspondingly enable the paddle 4301 to connect to the predetermined function control module 30. In this embodiment, the function switching switch 4323 is set at a predetermined distance from the paddle 4301 on the function switching piece 430, the function switching switch 4323 is correspondingly provided in the movable groove 10 provided on the surface shell 2 and/or the bottom shell 1. By moving the function switching switch 4323 to a predetermined position in the movable groove 10, the paddle 4301 is connected to the predetermined function control module 30. The structure is simple and the operation is convenient. In the specific implementation process, the edge of the movable groove 10 is provided with a corresponding gear mark corresponding to each of the functional control modules 30, toggle the function switching switch 4323 to the corresponding gear mark to turn on the corresponding function control module 30 accordingly.

In one embodiment, referring to FIG. 4, the function key module 4 also comprises a conductive chassis 45 with conductive contacts on the bottom surface corresponding to each function key 41, the function key 41 comprises a keycap 410 with one end exposed from the surface shell 2 and a keycap base 412 docked and fixed with the keycap 410, the keycap base 412 is correspondingly abutted against the top surface of the conductive chassis 45. In this embodiment, the function key 41 is composed of the keycap 410 and the keycap base 412 that are docked and fixed to facilitate the assembly of the function key 41. The keycap base 412 is in contact with the top surface of the conductive chassis 45. Pressing the keycap 410 connects the corresponding conductive contact and the circuit on the control circuit board 3 to realize the function of controlling the corresponding actions of the game character.

In one embodiment, referring to FIG. 4, connecting ears 4101 protrude from the side of the keycap 410, the keycap base 412 extends out of the connecting post 4121 corresponding to the connecting ears 410 and forms a accommodating groove 4123 in the middle, the function switching piece 430 is correspondingly embedded in the accommodating groove 4123. In this embodiment, the keycap 410 has its side connecting ears 4101 and the connecting posts 4121 on the keycap base 412 corresponding to the plug-in connection and is docked and fixed. The accommodating groove 4123 is formed in the middle of the keycap base 412 for embedded installation of the function switching piece 430, and the function switching piece 430 can pivot accordingly in the accommodating groove 4123. The structure is compact and easy to assemble.

In one embodiment, referring to FIG. 4, the function key module 4 also comprises an indicator light (not shown in figure) corresponding to the position of each function key 41, the surface of the function switching piece 430 is engraved with a character mark 434 corresponding to the function sorting layout of each of the function control modules 30, the indicator light projects the character mark 434 on the function key 41 to display the character mark 434, the function control module 30 is electrically connected to the indicator lights and controls the luminous color of the indicator lights corresponding to each of the functional sorting layouts to form a corresponding lighting layout. In this embodiment, character marks 434 corresponding to the function sorting layout of each function control module 30 are engraved on the surface of the function switching piece 430, and the character mark 434 is projected on the function key 41 through the indicator light. Players can understand the functions of each function key 41 according to the character mark 434, which facilitates learning and memorizing game operation skills, and the indicator light is controlled by the function control module 30, which facilitates to match the corresponding light color for each of the function keys 41 while switching to the corresponding function sorting layout to form a corresponding light layout. Players can judge the function of the function key 41 based on the color of the light, thereby improving the experience of using the game controller. During the specific implementation process, the angle between the character marks 434 located in the same direction in two adjacent groups of functional sorting layouts should be consistent with the angle between two adjacent functional control modules 30, to ensure the consistency of the relative movement of the function keys 41 between the character marks 434 and the movement of the paddle 4301 between the function control modules 30. When rotating and switching the function switching piece 430, it is possible to confirm whether the paddle 4301 has moved in place by identifying the position of the character mark 434, thereby improving the accuracy of the function switching operation.

Above are only preferred embodiments of the present disclosure and are not intended to limit the present disclosure. Any modification, equivalent replacement and improvement made within spirit and principle of the present disclosure should be comprised in protective scope of the present disclosure.

What is claimed is:

1. A game controller, comprising a bottom shell, a surface shell that butts up against the bottom shell to enclose an accommodation cavity, a control circuit board is fixedly installed in the accommodation cavity, and a function key module which is electrically connected to the control circuit board and comprises more than two function keys, wherein:

the control circuit board is correspondingly equipped with a plurality of function control modules, each function control module is respectively connected with the function key module to give each function key a corresponding function and form a different function sorting layout, the function key module also comprises a function switching module for switching the function sorting layout corresponding to the function key, the function switching module changes the function sorting layout of the function key by switching on different function control modules;

wherein the function switching module comprises a function switching piece pivotedly arranged in the accommodating cavity and a driving mechanism that drives the function switching piece to connect different function control modules, a paddle for switching on any one of the function control modules protrudes from the edge of the function switching piece, the function control module is correspondingly arranged around the outside of the function switching piece, the driving mechanism drives the function switching piece to rotate at a predetermined angle so that the paddle connects to the function control module at a predetermined position.

2. The game controller of claim 1, wherein the function switching piece is provided with a gear at a predetermined position, the driving mechanism comprises a driving gear meshed with the function switching piece and a function switching switch used to control the rotation angle of the driving gear so that the paddle is connected to the function control module at a predetermined position.

3. The game controller of claim 2, wherein the driving mechanism also comprises a rotating motor, and the driving gear is in transmission connection with the output end of the rotating motor, the function switching switch is used to control the rotation angle of the rotating motor.

4. The game controller of claim 2, wherein a mandrel extends from the axis center of the driving gear, the end of the mandrel passes through the surface shell and/or the bottom shell and forms the function switching switch, and the end surface of the function switching switch forms an operating part for screwing operation.

5. The game controller of claim 2, wherein the driving gear is a double gear set, the function switching switch is a push-pull rack, one gear of the double gear set is meshed with the function switching piece and the other gear is meshed with the push-pull rack, the push-pull rack is pushed and pulled to drive the double gear set to rotate, thereby driving the function switching piece to rotate at a predetermined angle and allowing the paddle to connect to the function control module at a predetermined position.

6. The game controller of claim 1, wherein the function switching piece is also provided with the function switching switch at a predetermined distance from the paddle, the surface shell and/or the bottom shell are provided with movable grooves corresponding to the function switching switch, the function switching switch slides to a predetermined position in the movable groove to correspondingly enable the paddle to connect to the predetermined function control module.

7. The game controller of claim 1, wherein the function key module also comprises a conductive chassis with conductive contacts on the bottom surface corresponding to each function key, the function key comprises a keycap with one end exposed from the surface shell and a keycap base docked and fixed with the keycap, the keycap base is correspondingly abutted against the top surface of the conductive chassis.

8. The game controller of claim 7, wherein connecting ears protrude from the side of the keycap, the keycap base extends out of the connecting post corresponding to the connecting ears and forms an accommodating groove in the middle, the function switching piece is correspondingly embedded in the accommodating groove.

9. The game controller of claim 1, wherein the function key module also comprises an indicator light corresponding to the position of each function key, the surface of the function switching piece is engraved with a character mark corresponding to the function sorting layout of each of the function control modules, the indicator light projects the character mark on the function key to display the character mark, the function control module is electrically connected to the indicator lights and controls the luminous color of the indicator lights corresponding to each of the functional sorting layouts to form a corresponding lighting layout.

* * * * *